E. Fitzgerald,
Aerating Dough.
Nº 45,706. Patented Jan. 3, 1865.
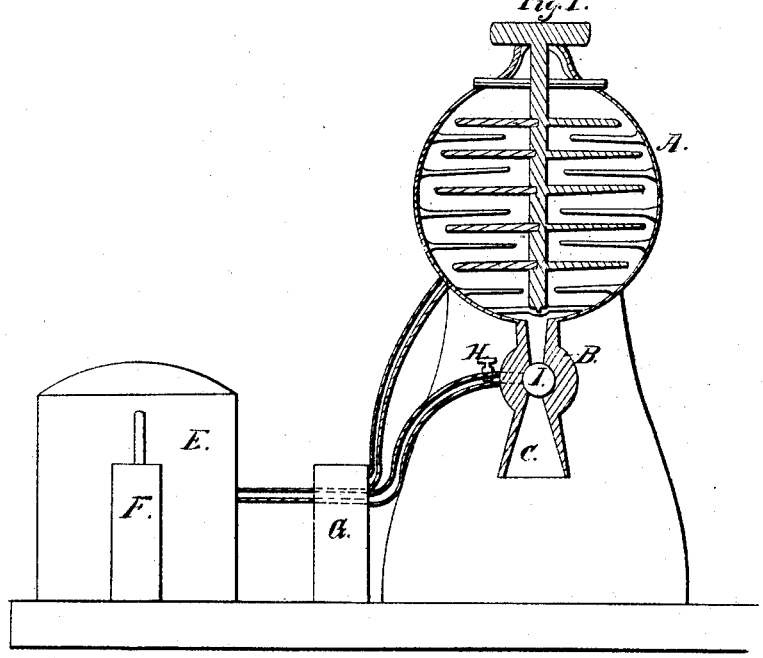
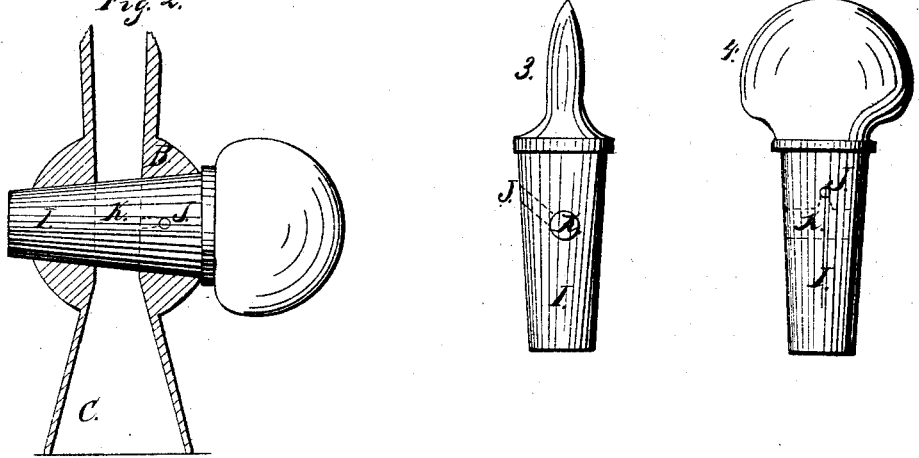
Witnesses.
Owen G. Warren
J. D. Shittenant
Inventor.
Elisha Fitzgerald

UNITED STATES PATENT OFFICE.

ELISHA FITZGERALD, OF NEW YORK, N. Y.

IMPROVEMENT IN APPARATUS FOR AERATING DOUGH.

Specification forming part of Letters Patent No. 45,706, dated January 3, 1865.

*To all whom it may concern:*

Be it known that I, ELISHA FITZGERALD, of the city, county, and State of New York, have invented a new and useful Improvement in Apparatus for Mixing Dough, in which I Supercharge it; and I hereby declare that the following is a full and exact description thereof.

To enable others skilled in the business to make and use my invention, I proceed to describe its construction and operation, reference being had to the drawings hereunto annexed, and making part of this specification.

Figure 1 is a section in the vertical line of the whole apparatus; Fig. 2, diagram enlarged of the parts claimed to be new; Fig. 3, the faucet, showing the aperture through which the dough is discharged; Fig. 4, the same, showing in face the hole admitting the air or gas into the passage with the dough at the time it is discharged.

The same letters refer to the same things in all the designs.

A is the mixing-receiver heretofore patented to this applicant and J. Perry; B, the outlet apparatus, somewhat exaggerated as to size; C, the expanded outlet; D, a pipe leading from an air or gas reservoir, E, to the faucet, and having a stop-cock attached; F, a pump to fill the reservoir E; G, a pump to fill the mixing-receiver; H, stop-cock to the air or gas pipe D; I, the faucet; J, the small hole for admitting the air or gas into the passage; K, the passage through the faucet-plug.

This apparatus is intended as an addendum to the aerating apparatus heretofore patented to James Perry and Elisha Fitzgerald.

My purpose is to supercharge the dough, which has been aerated or charged with gas in the mixing-receiver A, so as to make it more light and spongy, and to effect the purpose with a lower pressure of gas in the mixing-receiver. To this end I make a different outlet, B, for the dough. The passage I have heretofore used has a simple faucet, by the turning of which to open the passage the dough is discharged into the pan one loaf at a time. Instead of this simple faucet, I make the faucet I shown at Figs. 3 and 4 with the outlet-passage K, as before, and the hole J superadded to admit to the passage air or gas from the reservoir E by the pipe D. The hole J is not in the same direction as the passage K, but, for convenience, upon the side, (that being vertical,) and bored at an angle, so as to open into the passage K, through which the dough passes in being forced out from the mixing-receiver.

The faucet-plug I thus described is made to fit reasonably close in the body of the faucet B, and the hole J must be so arranged that when the plug I is turned to allow the passage out of the dough the hole J will admit the air or gas from the pipe D into the same passage with the dough and close again as that closes. The effect of this is to aerate the dough still more perfectly before it is expelled from the orifice at C. The pressure of the air or gas in the reservoir may be more or less than that in the mixing-receiver. I use about one hundred pounds to the inch.

I do not confine myself to admitting air or gas into the passage by the hole J, but exhibit that here to represent the general idea.

I vary the supercharging in several ways, all essentially the same:

First. I admit the supercharging air or gas by another faucet, set near and parallel to it, geared to the plug I, so as to open simultaneously the outlet-passage K and the hole J;

Second. I make the discharging-pipe of perforated metal, and inclose it in a jacket, into which the hole J leads, or to which the pipe D conducts the air or gas from the reservoir E. In this case, while the dough is being forced out the supercharging air or gas is mingled with it in a great number of jets through the perforated metal.

Third. With a similar jacket I admit the supercharging air or gas into the dough (which is being forced out through the passage) by few or many nipple-passages set opposite each other.

What I claim as my invention, and desire to secure by Letters Patent, is—

1. Supercharging the dough already aerated in the mixing-receiver by forcing air or gas into it in the passage K at the time the faucet is opened to permit the exit of the dough.

2. Forcing a jet of air or gas into the passage K at the time the dough is being expelled from the mixing-receiver.

3. Admitting the air or gas under pressure to come in contact and be infused in the dough in its passage out.

ELISHA FITZGERALD.

Witnesses:
OWEN G. WARREN,
J. D. STURTEVANT.